S. F. ARBUCKLE.
HEADLIGHT APPARATUS.
APPLICATION FILED JUNE 5, 1920.
1,409,912.
Patented Mar. 21, 1922.
2 SHEETS—SHEET 1.
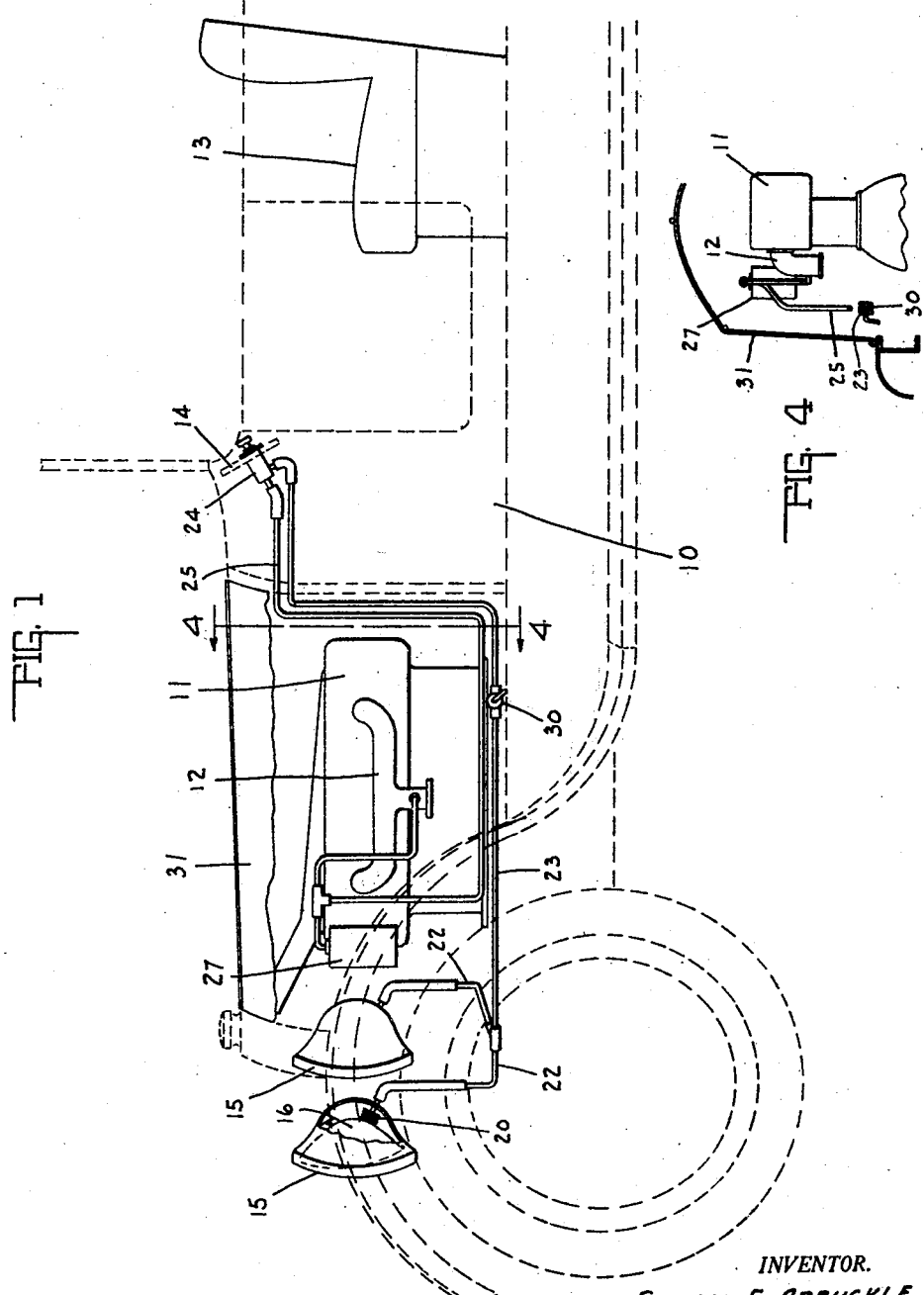
INVENTOR.
SAMUEL F. ARBUCKLE.
BY
ATTORNEYS.

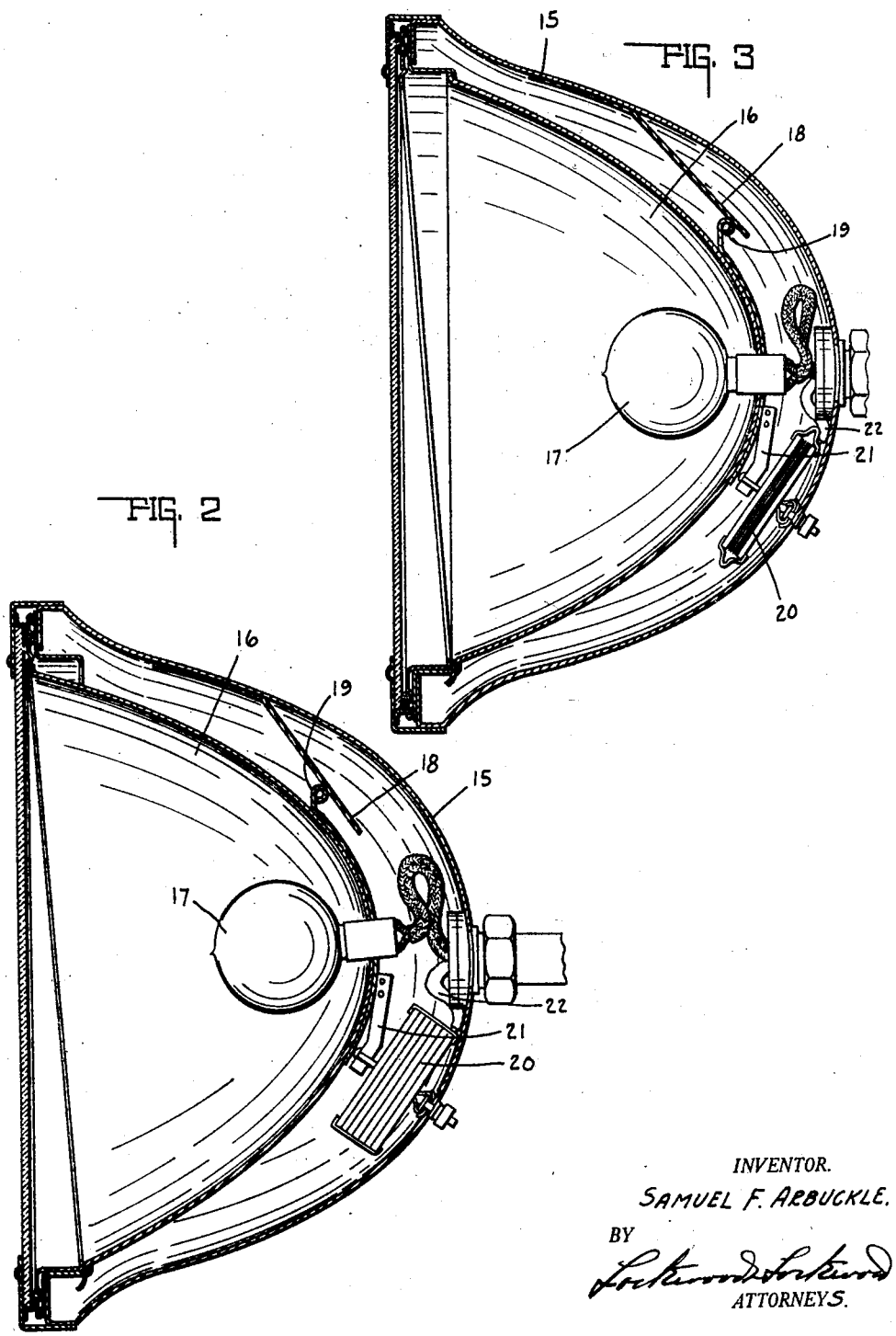

UNITED STATES PATENT OFFICE.

SAMUEL F. ARBUCKLE, OF CONNERSVILLE, INDIANA, ASSIGNOR TO UNITED STATES AUTOMOTIVE CORPORATION, OF CONNERSVILLE, INDIANA, A CORPORATION.

HEADLIGHT APPARATUS.

1,409,912.      Specification of Letters Patent.      Patented Mar. 21, 1922.

Application filed June 5, 1920. Serial No. 386,765.

*To all whom it may concern:*

Be it known that I, SAMUEL F. ARBUCKLE, a citizen of the United States, and a resident of Connersville, county of Fayette, and State of Indiana, have invented a certain new and useful Headlight Apparatus; and I do hereby declare that the following is a full, clear, and exact description thereof, reference being had to the accompanying drawings, in which like numerals refer to like parts.

The object of this invention is to provide headlight apparatus for automobiles, wherein the headlights are adjustable for directing the streams of light therefrom, and means accessible to the driver of the automobile while the automobile is traveling for adjusting and controlling said headlights, and means inaccessible to the driver of the automobile while the automobile is traveling for rendering said headlight control inoperative, whereby the driver of the automobile cannot change the adjustment of the headlights while the automobile is traveling.

Thus, in some States it is required that while an automobile is being driven in towns and cities, the headlights must be in the dimming position and the construction be such that the driver of the automobile cannot change the headlights from the dimming position while the automobile is traveling. In the country, on the other hand, it is desirable that the headlights be adjustable to direct the streams of light straight ahead, and in some States it is desirable that the driver shall have control of the adjustment of the headlights while the automobile is traveling.

Along with the foregoing features of the invention, is the further invention of providing means on the instrument board for controlling the adjustment of the headlights, and means under the hood of the automobile and inaccessible to the driver of the automobile while it is traveling, so that during such time he cannot change the adjustment of the headlights.

The full nature of the invention will be understood from the accompanying drawings and the following description and claims.

In the drawings, Fig. 1 is a side elevation of a portion of the automobile equipped with said improved headlight apparatus, parts of of the automobile being shown by dotted lines and the headlights in condition for dimming the lights. Fig. 2 is a central vertical section through one of the headlights with the reflector in downwardly tilted position for dimming. Fig. 3 is the same as Fig. 2, with the reflector in position for straight ahead distance lighting. Fig. 4 is a transverse section of a part of the automobile on the line 4—4 of Fig. 1.

There is shown herein an automobile 10 having an internal combustion engine 11 provided with an intake manifold 12, all of which may be of the usual type. 13 is the seat for the driver of the automobile and 14 the instrument board.

Two headlights are shown for the automobile, the casings thereof being stationary, the mounting means therefor not being shown in order to simplify the illustration. In the headlights here shown there are tilting reflectors 16 mounted in headlight casings, being hinged or pivoted at the bottom thereof, so that their upper portions swing to enable them to be moved from the straight ahead distance light position, shown in Fig. 3, to the tilting or dimming position, shown in Fig. 2, whereby the streams of light are directed downward on the roadway a short distance in front of the automobile, and, therefore, in position to prevent the glare to approaching automobiles. There is a lamp 17 in each reflector.

Said reflectors may be moved to the two positions above specified by any suitable means heretofore employed, but in the construction shown for illustrating the invention, there is a spring 18 secured to the inner surface of each headlight casing that bears against an arm 19 on the reflector, the parts being arranged so that said spring will push the reflector into a tilting position for casting the stream of light downward. For returning the reflector and bringing it to the other or straight ahead position, means is shown for employing air pressure, known as the vacuum system. As seen in Figs. 2 and 3, there is a bellows 20 secured to the inside of the casing and connected with an arm 21 on the lower part of the reflector. The bellows is in communication with a tube 22, one for each headlight, and the tubes 22 are in communication with the tube 23 leading to a valve 24 in the instrument board of the automobile. From said valve 24 a tube 25 leads to the intake 12 of the engine, whereby there is an air line running from the intake of the engine to the bellows in the headlights. When said air line is open, the suction of the engine will exhaust air from the bellows so as to bring it into the position shown in Fig. 3 and return the reflector from its tilted position and hold it until the valve 24 is operated again to release said air line, and then the springs 18 will return the reflectors to the tilted and dimming position, shown in Fig. 2. Said valve 24 can be operated from the seat of the automobile while the automobile is traveling, so that the driver of the automobile can adjust the position of the headlights for dimming or straight forward lighting, as desired. A vacuum tank 27 is connected with the air line for improving the operation of the device.

In order to prevent the driver of the automobile from having such control of the headlights and being able to change them while the automobile is running, a valve 30 is placed in the air line 23, between the valve 24 and the headlights and in a position inaccessible to anyone on the seat of the automobile, and preferably under the hood 31 of the automobile. With this construction the reflectors can be adjusted to either of the two positions by the positioning of the valve 30 and then the lights will be beyond the control of the driver of the automobile as the valve 30 is inaccessible to him while the automobile is running. When the need or occasion for preventing the driver of the automobile from controlling the headlights while the automobile is traveling, has passed, the hood can be raised and the valve 30 opened and then he can control said headlights while the automobile is running.

The invention claimed is:

1. The combination with a motor vehicle having a headlight casing, of a tiltable reflector pivotally mounted within said casing, vacuum control means for controlling the tilting movement of said reflector for varying the direction of the light projected therefrom, a valve accessible to the operator of the vehicle while the vehicle is traveling for operating said vacuum control means and the adjustment of said reflector, and a second and manually-operated valve inaccessible to said operator while the vehicle is traveling for rendering said first-mentioned valve inoperative, whereby said operator cannot change the adjustment of said reflector while the vehicle is traveling.

2. The combination with a motor vehicle having an internal combustion engine and an operator's seat, of a headlight reflector adjustable in position for controlling the direction of the light projected therefrom, an air line leading from the intake of the engine to the reflector, means in communication with said air line for controlling the adjustment of the reflector, means accessible to the operator on the seat of the vehicle for operating said controlling means through said air line, and a second manually operated means inaccessible to said operator while the vehicle is traveling for closing said air line between said operating means and the reflector, whereby the position of the reflector cannot be adjusted by the operator of the vehicle while traveling.

3. The combination with a motor vehicle having an internal combustion engine, a hood for said engine, and an operator's seat, of a headlight reflector adjustable in position for controlling the direction of the light therefrom, an air line leading from the intake of the engine to the reflector, vacuum control means in communication with said air line for controlling the adjustment of said reflector, a valve in said air line accessible to the operator on the seat of the vehicle for controlling said air line, and a second valve positioned within said hood and located between said controlling valve and reflector for closing said air line so as to prevent the controlling of said reflector by the operator of the vehicle while traveling.

In witness whereof, I have hereunto affixed my signature.

SAMUEL F. ARBUCKLE.